United States Patent [19]

Stankovich et al.

[11] 4,016,053

[45] Apr. 5, 1977

[54] FEEDING PARTICULATE MATTER

[75] Inventors: Ivan D. Stankovich, Piedmont; Stavros D. Louchis, Orinda, both of Calif.

[73] Assignee: Kaiser Aluminum & Chemical Corporation, Oakland, Calif.

[22] Filed: Oct. 1, 1975

[21] Appl. No.: 618,544

[52] U.S. Cl. .................. 204/67; 204/245; 302/28; 302/29; 302/59; 302/66

[51] Int. Cl.² .................. C25B 3/04; B65G 53/22

[58] Field of Search .............. 302/3, 28, 29, 59, 66; 204/67, 243 R, 244–246

[56] References Cited

UNITED STATES PATENTS

| | | | |
|---|---|---|---|
| 2,527,394 | 10/1950 | Browne et al. | 302/28 |
| 3,006,825 | 10/1961 | Sem | 204/67 |
| 3,135,672 | 6/1964 | Hirakawa et al. | 204/67 |
| 3,664,935 | 5/1972 | Johnson | 204/67 |
| 3,681,229 | 8/1972 | Lowe | 204/243 R |
| 3,850,479 | 11/1974 | Boymont et al. | 302/29 |
| 3,870,374 | 3/1975 | Wentzel et al. | 302/28 |
| 3,871,711 | 3/1975 | Rusterholz | 302/66 |

*Primary Examiner*—Evon C. Blunk
*Assistant Examiner*—Jeffrey V. Nase
*Attorney, Agent, or Firm*—Paul E. Calrow; Edward J. Lynch

[57] ABSTRACT

The invention relates to the feeding of finely divided particulate matter in a fluidized state from a source to a plurality of discharge points wherein discrete quantities of particulate matter are discharged by suitable feeding devices. In more detail, the invention comprises a primary air activated gravity conveyor and a plurality of secondary air activated gravity conveyors leading away from the primary conveyor to direct particulate matter to the feeding units associated with each secondary conveyor. The primary and secondary conveyors are maintained full of fluidized particulate matter at all times.

9 Claims, 9 Drawing Figures

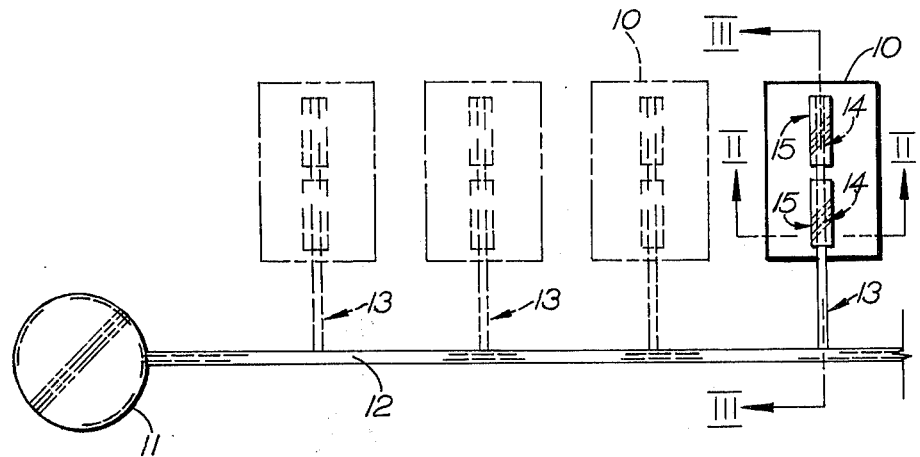
Fig-1
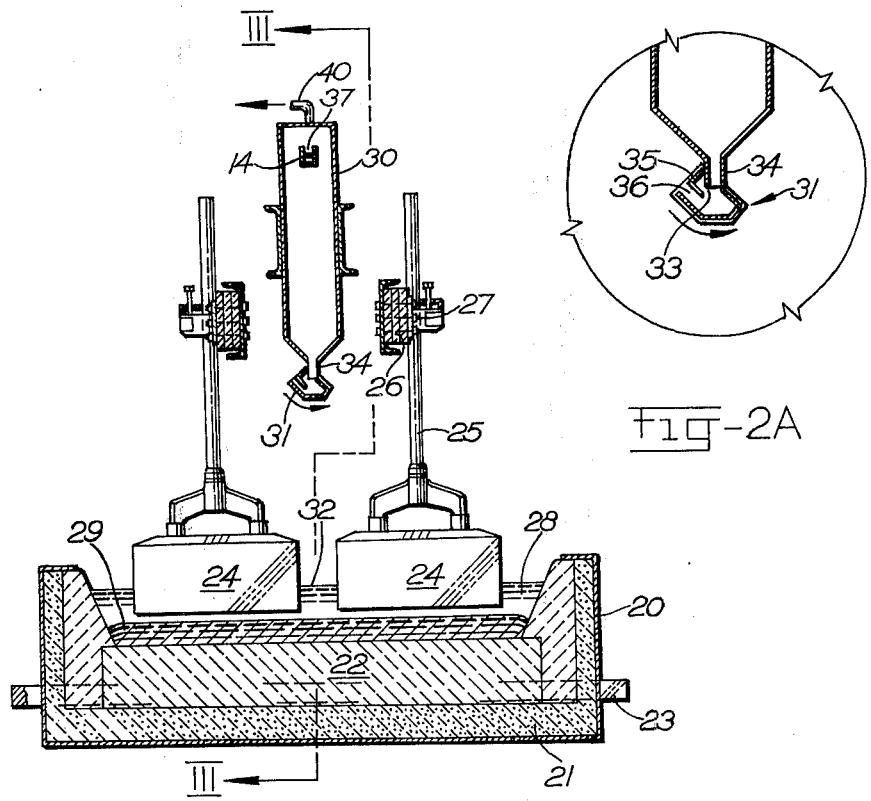
Fig-2A
Fig-2

FEEDING PARTICULATE MATTER

BACKGROUND OF THE INVENTION

This invention relates to a method and system for transferring finely divided particulate matter from a single source thereof to a plurality of discharge points, such as in the transfer of finely divided alumina to a plurality of aluminum reduction cells in a potline.

Primary aluminum is almost universally produced by the Hall-Heroult process wherein alumina ($Al_2O_3$) is electrolytically reduced to aluminum metal in a fused fluoride salt electrolyte. Aluminum plants employing this process generally have a number of reduction cells (e.g., 80–160) electrically connected in series and either positioned side-by-side as with prebake cells or end-to-end as with Soderberg cells. For a more detailed description of the process, see *The Chemical Background of the Aluminium Industry* by T. G. Pearson (1955).

In the operation of aluminum reduction cells, small, discrete quantities of alumina are fed to each reduction cell to replenish the dissolved alumina which is consumed in making the metal. If the alumina dissolved in the fused salt electrolyte is reduced too much, an anode effect occurs where the resistance of the cell increases dramatically. Usually, alumina is added on one of three schedules, namely, at periodic intervals, when the resistance of the cell indicates that an anode effect is imminent, or when an anode effect occurs. But, in each instance, alumina is added only in small quantities, i.e., less than 200 pounds, usually less than 50 pounds, to avoid "mucking up" the cell (sometimes referred to as a sick cell) where undissolved alumina settles to the cathode-metal interface and thereby interfaces with the electrolytic process.

In most commercial aluminum plants, alumina is fed to the reduction cell either from a feed hopper permanently fixed to the cell superstructure or from a feed hopper mounted on a wheeled or tracked vehicle which moves from cell to cell. In the former instance, the feed hopper on the cell is filled with alumina from a bucket carried by an overhead crane. These prior methods have been less than satisfactory because they are inefficient, time-consuming, expensive and moreover, generate much dust in the potroom due to the frequent transfer of finely divided alumina from container to container.

Other methods of feeding reduction grade alumina to the reduction cell have been suggested wherein alumina is transported pneumatically or in some other fluidic form, such as with air activated gravity conveyors. However, such methods have not met with much commercial success, due in part to the difficulty in controlling the feeding of small individual quantities of alumina which are necessary for efficient reduction cell operation. Such fluidic methods are shown or described in U.S. Pat. Nos. 3,681,229; 3,006,825; 3,664,935; and 3,870,374.

It is against this background that the present invention was developed.

DESCRIPTION OF THE DRAWINGS

FIG. 1 is a plan view of a portion of an aluminum reduction potline incorporating the particulate transporting means of the invention.

FIGS. 2 and 3 are cross-sectional views of a reduction cell taken along the lines II—II and III—III, respectively, shown in FIG. 1.

FIG. 2A is an enlargement of the feeding gate shown in FIG. 2.

DESCRIPTION OF THE INVENTION

Figure 3:
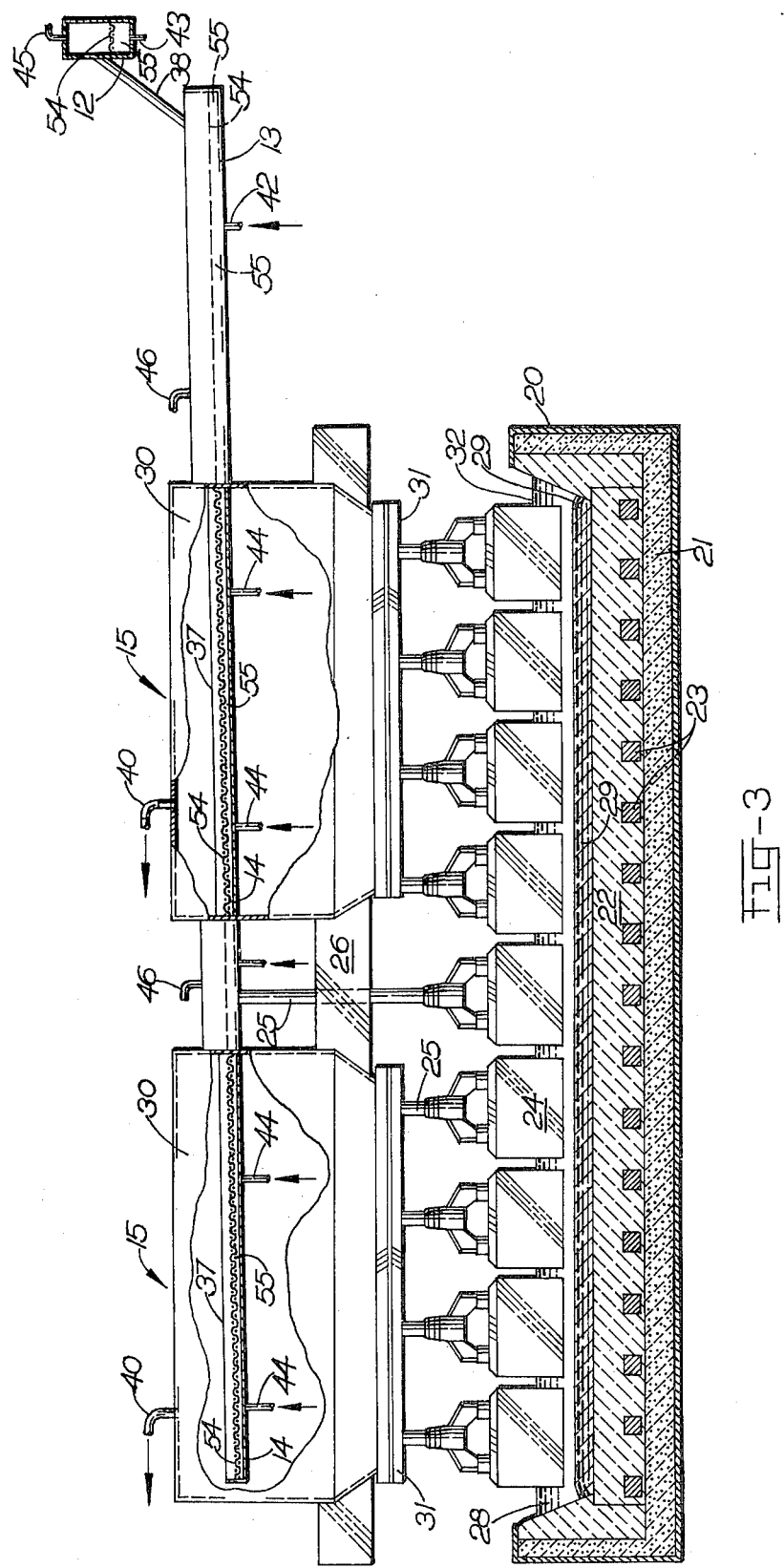

The invention relates to the transfer of finely divided particulate matter from a source thereof to a plurality of discharge points by means of fluidized gravity conveyor systems commonly termed air-slides or air activated gravity conveyors and sold under the registered trademark Airslide. The invention is specifically directed to the utilization of primary and secondary fluidized conveyor systems, both of which are maintained full of fluidized particulate matter at all times, i.e., the conveyor systems are "choke fed". At the discharge points of the secondary conveyor systems, feeders are provided with discharge small, discrete quantities of particulate matter in a desired manner.

In accordance with the invention, a primary fluidized conveyor system comprising air activated gravity conveyors accepts particulate matter from a source, such as a bin or other container, and is adapted to discharge fluidized particulate matter into a plurality of independent secondary fluidized conveyor systems. The secondary systems direct the fluidized material to a plurality of discharge points having feeders which discharge discrete quantities of particulate matter. Both the primary and secondary fluidized conveyor systems are essentially choke-fed, i.e., completely filled with fluidized particulate matter at all times. The fluidized particulate mass in the conveyor system of the invention is a definite fluidized bed with particle entrainment less than 10%, usually less than 5%, (by weight) of particulate flow. The porosity of the fluidized bed will be considerably less than unity. Particle size of the pulverulent material generally should be less than 100 mesh (Tyler screen size), preferably less than 200 mesh in maximum dimension.

Upon the actuation of the feeding mechanism to discharge small, discrete quantities of particulate matter, the fluidized material in the secondary fluidized conveyor system immediately begins to refill the feed mechanism. Moreover, because the primary fluidized conveyor system is also maintained full of fluidized material, the primary system then begins to refill the secondary conveyor systems. Thus, the system is entirely self-regulated. There is no need for bin indicators and the like to determine the level of particulate matter in the feeding device. If the feeding devices at the discharge points on the secondary conveyor systems are automated, the entire system then becomes automated.

The particulate matter in the various conveyors of the invention is maintained in a fluidized state at all times and therefore the fluidized conveyors are sized as small as possible to reduce the amount of gas flow requirements for maintaining the fluidized condition of the particulate matter. For example, in a typical installation, the air activated gravity conveyors of the primary fluidized conveyor system generally will have a width of about 2–6 inches and those of the secondary fluidized conveyor systems have a width of about 1–4 inches.

The invention is particularly adaptable to the feeding of finely divided reduction grade alumina to a plurality of aluminum reduction cells. In such an installation, a primary fluidized conveyor system is disposed along the entire length of a potroom or a large portion thereof and independent secondary fluidized conveyor systems feed alumina from the primary fluidized conveyor system into feed hoppers positioned on or adjacent the superstructure of one or more reduction cells.

The advantages of the invention in an aluminum reduction plant are readily recognized by those skilled in the art. The invention avoids the requirement of using an overhead crane and a bucket for feeding alumina to the hoppers and all the problems inherent in this type of feeding system. The present system is preferably entirely closed to the atmosphere to thereby significantly reduce the dust load within the potline. The present system also eliminates the need for loading stations and their attendant dust collection systems, thereby reducing the capital cost involved. Moreover, because the present system is completely self-regulating, the system uses considerably less manpower than systems previously used.

In a crane operated feeding system, many times alumina is spilled around the shell of the reduction cell, which insulates the shell and prevents the escape of heat from the sides thereof. This causes the cell to overheat and results in the premature destruction of the carbon lining of the reduction cell. These alumina spills also can increase the voltage drop across the cell by increasing the temperature of the connection between the cathode bars and bus connections. With the present invention, alumina spills are avoided for all practical purpose.

FIG. 1 is a highly simplified plan view of a portion of an aluminum potline comprising a plurality of reduction cells 10 positioned side-by-side and electrically connected in series. A bin 11 is provided at one end of the potline as a source for the finely divided alumina. Alumina is discharged from bin 11 to the primary fluidized conveyor system 12 which extends along the entire length of the potroom or at least a large portion thereof. Individual secondary fluidized conveyor systems 13 lead away from the primary fluidized conveyor system 12 and are provided with extensions 14 disposed within feeding devices 15 which discharge alumina therein. The feeding devices 15 feed small discrete quantities of alumina to the reduction cells 10.

FIGS. 2 and 3 are cross-sectional views taken along the lines II—II and III—III, respectively, in FIG. 1. These figures illustrate a preferred embodiment of the invention in the environment of a conventional aluminum reduction cell having prebaked anodes. To simplify the drawings, many of the details of the cell, particularly in the superstructure, have been omitted. The reduction cell generally includes a steel shell 20 into which is disposed an insulating layer 21 of particulate alumina and a lining of carbonaceous material which forms the cathode 22. Cathode bars 23 are disposed within the carbonaceous cathode 22. Two rows of prebaked carbon anodes 24 are partially disposed in the cavity defined by the cell lining with each anode being supported by an anode rod 25 connected to the anode bus bar 26 by means of a suitable clamp 27. The lower portion of each anode is immersed in the molten fluoride salt electrolyte 28 and is disposed a short distance away from the molten aluminum pad 29 which lies between the molten salt layer 28 and the carbonaceous cathode 22. Two feeding means 15 comprise feed hoppers 30 disposed between the two rows of anode rods 25 and each feeder is provided with a discharge gate 31 which, when rotated in the direction of the arrow shown in FIG. 2, feeds small discrete quantities of alumina onto the frozen salt crust 32 which lies on the molten electrolyte 28. The discharge gate 31 shown in more detal in FIG. 2A is in the closed position which causes the chamber 33 within the body of the gate to be filled with particulate matter from the hopper spout 34. When the gate 31 is rotated in the manner shown in the drawing, angle element 35 closes off spout 34 of the feed hopper 30 and the alumina in the chamber 32 is discharged through opening 36 onto the crust 32 of the cell. A punch or other suitable device (not shown) is used to break the electrolyte crust 32 and allows the particulate alumina to fall into the electrolyte and be dissolved therein. In most modern aluminum reduction plants, the actuation of the gate and the punch device are automatically controlled. With such automatic actuation, the feeding system of the invention becomes completely automatic.

Extension 14 of the secondary fluidized conveyor 13 passes through both feed hoppers 30 and at least part of the extension 14 disposed within the feed hoppers 30 is opened at the top 37 thereof in each hopper 30 to allow fluidized alumina to be discharged therefrom. Preferably, both the primary and the secondary conveyor systems disposed outside the feed hoppers are completely enclosed to avoid creating a dust problem. As shown more clearly in FIG. 3, fluidized alumina is fed from the primary fluidized conveyor system 12 to the secondary fluidized conveyor 13 through conduit 38. The feed hoppers 30 are provided with vents 40 for directing gas and entrained dust to a suitable dust collecting facility (not shown). Conduits 42, 43 and 44 are provided in the lower portion of the secondary fluidized conveyors 13, the primary fluidized conveyors 12 and the extensions 14 to introduce the fluidizing gas into the plenum chamber 55 disposed beneath the fluidizing surface 54. Conduits 45 and 46 are provided to vent the fluidizing gas from the upper portion of the air activated gravity conveyors to a suitable dust collecting facility (not shown).

Figure 4:
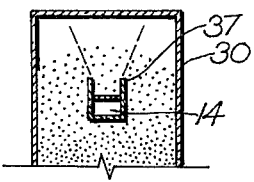
FIGS. 4, 5 and 8 are sectional views of hopper associated with an alumina feeding device on an aluminum reduction cell, which illustrate the operation of various embodiments of the invention.
Figure 5:
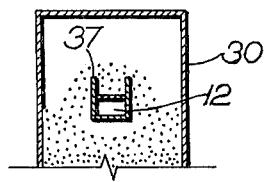

The operation of the extension 14 is shown in FIGS. 4 and 5. The alumina in both the primary and secondary conveyors is maintained fluidized at all times and, except when refilling, are completely full of fluidized alumina, i.e., choke-fed. The fluidized alumina flows out of the opened-top 37 of extensions 14 until the unit weight of particulate alumina is in balance with fluidizing air pressure, i.e., reaches the point shown in FIG. 4. The alumina in the extension 14 and that directly above the extension 14, indicated by the dotted lines in the drawing, is maintained in a fluidized condition at all times, i.e., the gas velocity through the materials at or above the critical velocity necessary to maintain the particulate material fluidized. When the gate 31 on the feed hopper 30 discharges particulate alumina onto the crust 32 of the cell, fluidized alumina from the extensions 14 immediately begins to refill the hopper by flowing over the upper open edges 37 of extension 14 as shown in FIG. 5. The feeding of particulate matter to hopper 30 continues until the particulate matter builds up over the upper open edges 37 of extension 14 as shown in FIG. 4.

Figure 6:
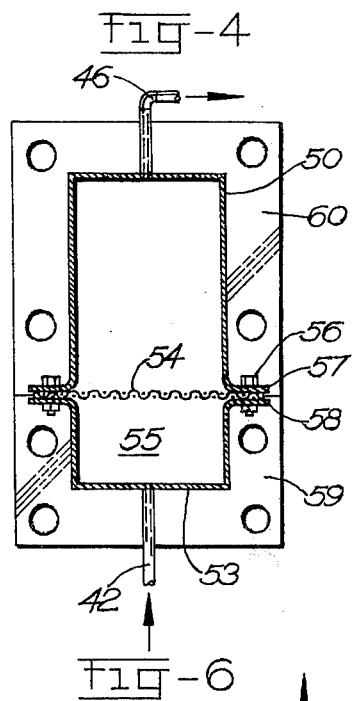
FIGS. 6 and 7 are cross-sectional views of air activated gravity conveyors useful in the invention.
Figure 7:
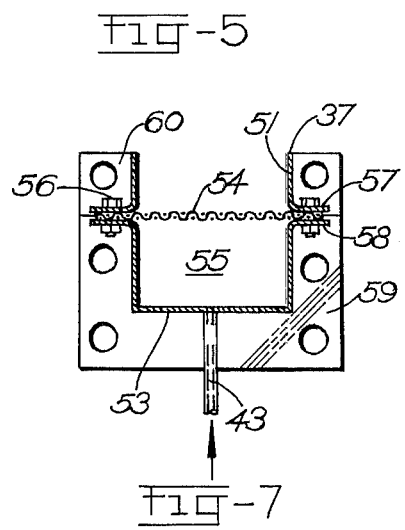

Typical detailed cross sections of the air activated gravity conveyors of the invention are shown in FIGS. 6 and 7. FIG. 6 illustrates a closed air slide which is typical of the primary and secondary conveyor systems and FIG. 7 illustrates the opened-top conveyor utilized as extensions 14 of the secondary systems in the feed hoppers. The primary and secondary conveyors generally have an upper closed portion 50 as shown in FIG. 6, whereas the extensions have an opened-top upper portion 51 as shown in FIG. 7. The lower portion 53 is essentially the same for each. A porous fluidizing planar element 54, preferably multi-ply canvas fabric, is disposed between the upper and lower portions and defines a plenum chamber 55 which contains the fluidizing gas. The fluidizing element 54 is disposed between the upper and lower portions of the fluidized conveyor by means of bolts 56 which are connected through the flanges 57 and 58 of the upper and lower portions, respectively. The primary and secondary fluidized conveying systems and the extensions disposed within the feed hopper can be conveniently made up in sections of conveyors with each section provided with flanges 59 and 60 at each end for connecting purposes. Preferably, a suitable adhesive cement is provided at the mating surfaces of the flanges during installation to seal the contact surfaces so as to prevent the escape gas, dust and the like. The unit when installed should be as gas-tight as possible. Preferably, the air activated gravity conveyors are inclined at an angle of up to 10° from the horizontal to facilitate flow of the fluidized particulate matter.

The fluidizing planar element 54 can be formed of any suitable material, such as conventional multi-ply cotton canvas fabric normally employed in air actuated gravity conveyors or porous refractory, porous bronze and the like. If the fluidizing surface is a fabric, it should be maintained taut and should have a permeability of about 1–10 cubic feet per minute per square foot of fabric at a differential pressure of 2 inches $H_2O$.

Generally, the air activated gravity conveyors of the primary fluidized conveyor system will have a much larger cross section than those of the secondary fluidized conveyor system due to the larger load of fluidized material usually carried by the primary conveyor. Moreover, because of the larger load carried and the extended length of the primary conveyor system, the gas pressure within the plenum chamber of the primary system will normally be considerably greater than that in the secondary systems. In general, the fluidizing gas pressure within the plenum chambers of both systems will range from about 2–50 inches $H_2O$ (gauge), preferably about 5–30 inches $H_2O$ (gauge). Any suitable means can be employed with the invention to transfer the fluidized alumina from the primary fluidized conveyor system to the secondary fluidized conveyor systems. A well-known suitable device is shown in U.S. Pat. No. 2,527,394 which involves removing fluidized alumina from the side of the fluidized conveyor. Suitable bottom discharge units can also be employed. The air activated gravity conveyor systems herein are primarily described as rectilinear in cross section; however, they can be of any convenient cross section, such as, for example, circular.

Although the secondary fluidized conveyor systems are shown in the drawing as straight units, the invention is not so limited. A secondary system may have one or more branches and can be used to direct particulate matter to a plurality of feeding devices. For example, a secondary fluidized conveyor can be disposed between two reduction cells with branches thereof directing particulate matter to the feeders on the two cells.

Figure 8:
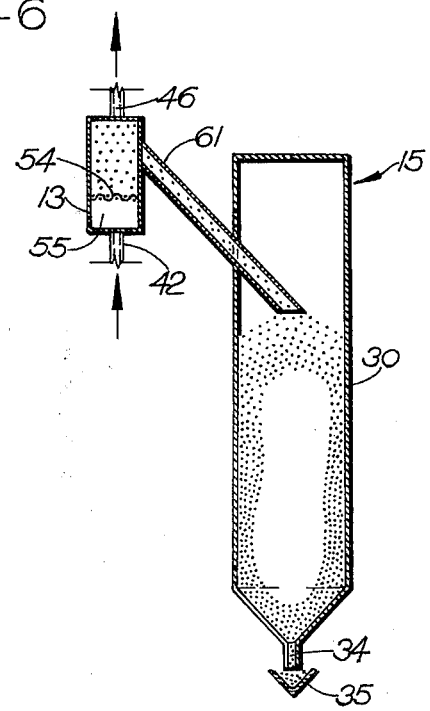

In existing aluminum reduction cells, it may be difficult to utilize the aforedescribed preferred embodiment in the manner described because of the crowded conditions on the reduction cell superstructure. The anode busses, anode bars, pot covers, exhaust ducts, crustbreakers, walkway gratings and the like make it very difficult to install secondary conveyor extensions in the feed hoppers disposed on the cell superstructure. In such cases, it may be necessary to use the design shown in FIG. 8 wherein the secondary fluidized conveyor is disposed a short distance away from the cell, e.g., to the side as shown in the drawing, with a suitable chute 61 or other conduit for transferring the alumina into the feed hopper. The operation of this alternative system would be as previously described wherein when the alumina is discharged from the feed hopper, fluidized alumina from the secondary conveyor refills the hopper and the fluidized alumina in the primary conveyor refills the secondary conveyor.

Although the description of the preferred embodiment is directed to feeding alumina to reduction cells having prebaked anodes, the invention is fully applicable to aluminum reduction cells which utilize a baked-in-place anode, commonly termed "Soderberg" cells. Furthermore, the invention can be used with other particulate materials, such as cement, grain, flour and the like.

It is obvious that various modifications and improvements can be made to the present invention without departing from the spirit thereof and the scope of the appended claims.

What is claimed is:

1. A method of feeding finely divided reduction-grade alumina to a plurality of aluminum reduction cells, each of said cells having at least one feeding device with a supply hopper associated therewith which feeds discrete quantities of alumina to the reduction cells comprising
   a. feeding finely divided alumina from a source thereof to a primary air-activated gravity conveyor system;
   b. fluidizing the alumina in the primary air-activated gravity conveyor system and continuously maintaining the primary air-activated gravity conveyor systems essentially full of fluidized alumina;
   c. transferring alumina from the primary air-activated gravity conveyor system to a plurality of secondary air-activated gravity conveyor systems;
   d. fluidizing alumina in the secondary air-activated gravity conveyor systems and continuously maintaining the secondary conveyors essentially full of fluidized alumina;
   e. transferring alumina from the secondary air-activated gravity conveyor systems to the supply hoppers associated with the feeding devices and maintaining the level of alumina within the feed hoppers at a desired level so that when one or more of the feeding devices feed discrete quantities of alumina to a reduction cell, the supply hopper is refilled with alumina from the secondary air-activated gravity conveyor system, the secondary air-activated gravity conveyor system is refilled with alumina from the primary air-activated gravity conveyor system and the primary air-activated gravity conveyor system is refilled with alumina from the alumina source.

2. The method of claim 1 wherein fluidized alumina is caused to flow from the secondary fluidizing conveyor systems into supply hoppers associated with the feeding devices through open-topped fluidizing air-activated, gravity conveyors disposed within said supply hoppers and in fluid communication with the secondary fluidizing conveyor systems, wherein the fluidized alumina in the open-topped, fluidizing conveyors is caused to flow over the upper open edges thereof until the supply hopper is filled with alumina above the level of said open edges and wherein alumina in the open-topped fluidizing conveyors and alumina directly above said open tops are thereafter maintained in a fluidized condition.

3. The method of claim 2 wherein the amount of alumina entrained in the fluidizing gas which escapes from the fluidizing conveyors is less than 10% by weight of the alumina in the fluidizing conveyors.

4. The method of claim 1 wherein the alumina is essentially all less than 200 mesh (Tyler screen mesh size) in maximum dimension.

5. A system for transferring finely divided particulate matter from a source thereof to a plurality of discharge points, each of said discharge points having a feeding device associated therewith for feeding discrete quantities of particulate matter comprising
   a. a primary fluidizing conveyor system which receives particulate matter from said source and which is provided with means to fluidize particulate matter received from said source to cause said fluidized particulate matter to flow within the primary fluidized conveyor system and to continuously maintain the primary fluidizing conveyor system essentially full of fluidized particulate matter;
   b. a plurality of secondary fluidizing conveyor systems which receive particulate matter from the primary fluidizing conveyor system and which are provided with means to fluidize particulate matter therein, to cause the said fluidized particulate matter to flow within the secondary fluidizing conveyor systems and to continuously maintain the secondary fluidizing conveyor essentially full of particulate matter; and
   c. hoppers associated with the feeding devices to supply particulate matter thereto which receive particulate matter from the secondary fluidizing conveyors and which are provided therein with open-topped fluidizing conveyors in fluid communication with the secondary fluidizing conveyors to feed particulate matter to the inner chamber of said hopper.

6. The system of claim 5 wherein the open-topped fludizing gravity conveyors are provided with means to fluidize particulate matter therein and cause fluidized particulate matter to flow over the upper open edges of the open-topped fluidizing gravity conveyors and into the hopper until the hopper is filled to a level above that of the upper open edges.

7. The system of claim 6 wherein said fluidizing means associated with the open-topped fluidizing conveyors maintain the particulate matter disposed above the upper open edges thereof in a fluidized condition.

8. The system of claim 5 wherein the primary and secondary fluidizing conveyor systems comprise air-activated gravity conveyors.

9. The system of claim 8 wherein the air activated gravity conveyors are disposed at an angle of up to 10° from the horizontal.

* * * * *